United States Patent [19]

Naka et al.

[11] Patent Number: 5,168,352
[45] Date of Patent: Dec. 1, 1992

[54] COLORING DEVICE FOR PERFORMING ADAPTIVE COLORING OF A MONOCHROMATIC IMAGE

[75] Inventors: Motohiko Naka; Mie Saitoh, both of Kawasaki; Takehisa Tanaka, Tokyo; Kunio Yoshida, Kawasaki, all of Japan

[73] Assignee: Matsushita Electric Industrial Co., Ltd., Osaka, Japan

[21] Appl. No.: 480,456

[22] Filed: Feb. 15, 1990

[30] Foreign Application Priority Data

Feb. 16, 1989 [JP] Japan .................................. 1-36779

[51] Int. Cl.⁵ .............................................. H04N 9/02
[52] U.S. Cl. ........................................ 358/81; 358/82; 358/75; 382/15
[58] Field of Search .................. 358/81, 82, 75; 364/513; 382/14, 15

[56] References Cited

U.S. PATENT DOCUMENTS 4,760,604  7/1988  Cooper .......................... 364/715.01
4,926,250  5/1990  Konishi .............................. 358/81

OTHER PUBLICATIONS

"A Wafer Scale Integration Neural Network Utilizing Completely Digital Circuits" by Moritoshi Yasunaga et al., IEEE International Joint Conference on Neural Networks, Washington, D.C., Jun. 1989.
Richard P. Lippmann, An Introduction to Computing with Neural Nets, IEEE ASSP Magazine Apr. 1987.

*Primary Examiner*—James J. Groody
*Assistant Examiner*—Sherrie Hsia
*Attorney, Agent, or Firm*—Lowe, Price, LeBlanc & Becker

[57] ABSTRACT

A coloring device includes an image sampling device for sampling an input signal block representing a group of n × m pixels of a monochromatic image and for outputting first signals representing the sampled pixels of the input signal block of the monochromatic image; and artificial neural network, a connection for providing to the artificial neural network, substantially simultaneously, pattern information on patterns to be contained in the monochromatic image and color information on first data indicating colors given to the patterns indicated by the pattern information prior to generation of a color image signal, the artificial neural network having internal state parameters which are adaptively optimized by using a learning algorithm prior to the generation of a color image, the artificial neural network operating for receiving data representing the first signal, for determining which of colors preliminarily and respectively assigned to patterns to be contained in the group of pixels of the monochromatic image represented by the input signal block is given to a pattern actually contained in the group of pixels represented by the input signal block and for outputting second signals representing second data on three primary colors which are used to represent the determined colors given to the patterns actually contained in the group of pixels represented by the input signal block; and a color image storing device for receiving the second signals outputted from the artificial neural network, for storing the received second signals in locations thereof corresponding to the positions of the pixels represented by the input signal block and for outputting third signals representing the three primary color component images of the pixels represented by the input signal block; wherein the image sampling device further functions for scanning the whole of the monochromatic image by generating successive input signal blocks representing successive groups n × m pixels to be sampled, thereby outputting third signals for all pixels of the monochromatic image.

10 Claims, 3 Drawing Sheets

COLORING DEVICE FOR PERFORMING ADAPTIVE COLORING OF A MONOCHROMATIC IMAGE

BACKGROUND OF THE INVENTION

1. Field of the Invention

This invention relates to a coloring device which can compress image data and generate a color image from a monochromatic photograph by automatically generating a color graphic form or image from a monochromatic graphic form or image when a color image is generated from a monochromatic image and which can be applied to, for example, a color image storage device and a color facsimile system.

2. Description of the Related Art

Previously, three-primary-color signals have been considered as variables or variates independent of each other. Thus, there have been made few researches on compression and coding of color image data using the correlations among the three primary colors. However, several researches have been carried out recently on reproduction of a color image from a monochromatic image using local correlations among color images. For the particulars of such researches, please refer to, for example, an article entitled "Prediction and Reproduction of Color Image from Monochromatic Image Using Correlations among Three Color Signals" written by Kodera et al., Proceedings of '88 National Conference of Institute of Electronics and Communication Engineers of Japan.

Hereinafter, this conventional system will be explained by referring to FIG. 4. In this figure, reference numerals 41, 42 and 43 indicate data on the three primary colors (red; green; and blue, or cyan; magenta; and yellow) of color images. Let 42 denote data on a reference color. With respect to data of a block composed of n×m picture elements or pixels (FIG. 4 shows the case where the block is composed of 3×3 pixels), prediction coefficients relating to the color data 41 and 43 of predetermined polynomials are respectively evaluated in the prediction coefficient evaluating portions 50 and 51 on the basis of the data on the reference color. The data on the reference color and the prediction coefficients of each block are then sent to the next stage. Thereafter, prediction is effected with regard to each block from the data 41 and 43 by prediction portions 52 and 53 by using prediction functions, and thus data 49 and 50 are reproduced.

In the prior art, an adaptive prediction function can be obtained for each block of pixels, though the form of the function is limited to a predetermined polynomial. Thus, the prior art coloring devices have not employed approximation by using nonlinear combination of polynomials. This results in that the prior art coloring devices have encountered a problem that the approximation cannot be optimized in some images.

The present invention is provided to eliminate the drawbacks of the conventional system.

It is therefore an object of the present invention to provide a coloring device which can generate an optimized color image by adaptively coloring a monochromatic image.

SUMMARY OF THE INVENTION

To achieve the foregoing object and in accordance with the present invention, there is provided a coloring device for transforming a monochromatic image to a color image having three primary color component images by coloring portions of the monochromatic image and for storing the three primary color component images. The inventive coloring device includes an image sampling means for sampling an input signal block representing a group of n×m pixels of a monochromatic image and for outputting first signals representing the sampled pixels of the input signal block of the monochromatic image. There is further included an artificial neural network for receiving the first signals outputted from the image sampling means, for determining the three primary color components of each pixel correspondingly to a pattern actually contained in the input signal block according to information on corresponding relation between three primary color components and patterns to be contained in each input signal block, which relation is preliminarily determined by internal state parameters adaptively optimized by using a learning algorithm, and for outputting second signals representing three primary color components of each pixel represented in the input signal block. The invention further includes color image storing means for receiving the second signals outputted from the artificial neural network, for storing the received second signals in locations thereof corresponding to the positions of the pixels represented in the input signal block and for outputting third signals representing the three primary color component images of the color image, thereby to enable display of the color image. The image sampling means of the invention further functions for scanning the whole of the monochromatic image by generating input signal blocks representing all the pixels of the monochromatic image. The image sampling means more specifically generates successive input signal blocks representing successive groups of n×m pixels to be sampled, thereby outputting third signals for all pixels of the monochromatic image.

To the artificial neural network, the various patterns and the color information are inputted at the same time. Then, the internal state parameters of the artificial neural network are adaptively optimized by learning the patterns and the color information. Thereafter, the monochromatic image signals are inputted to the artificial neural network which then outputs colored data.

Thereby, an optimized color image can be obtained by adaptively coloring an objective monochromatic image.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF A PREFERRED EMBODIMENT

Hereinafter, a preferred embodiment of the present invention will be described by referring to the accompanying drawings.

Figure 1:
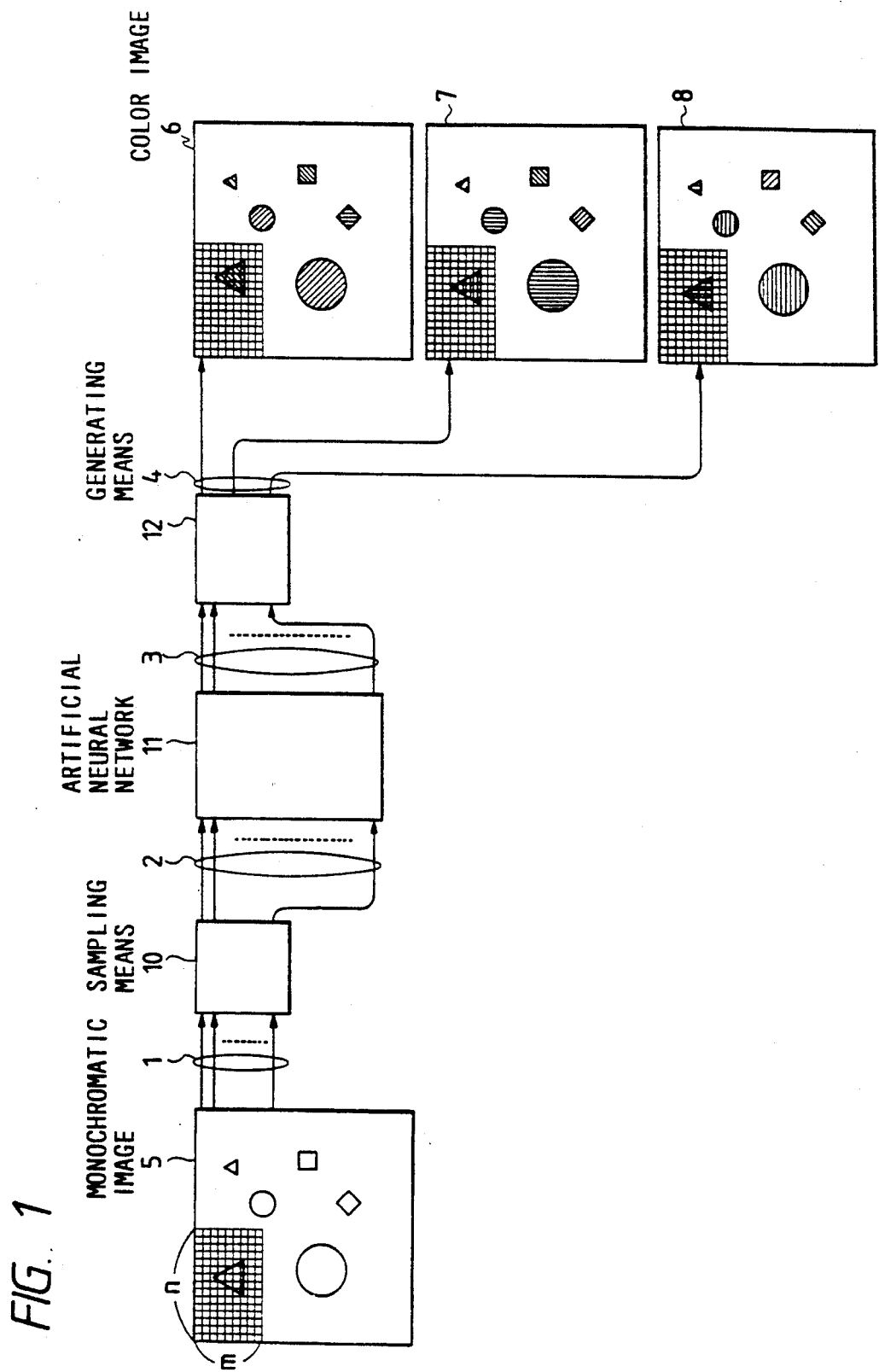
FIG. 1 is a schematic block diagram for illustrating the fundamental configuration of a preferred embodiment of the present invention.
Figure 2:
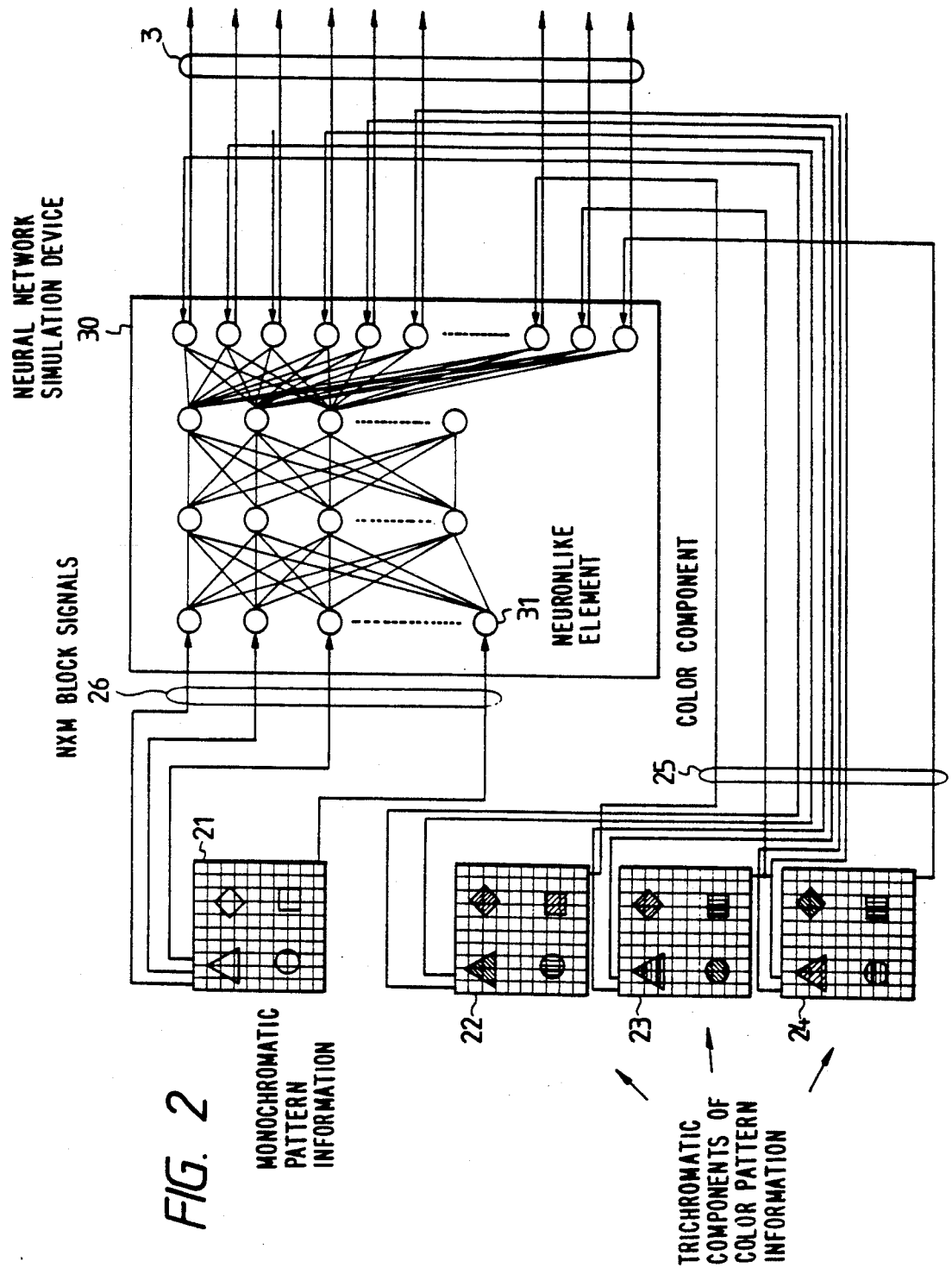
FIG. 2 is a detailed view of an artificial neural network means 11 of FIG. 1.
Figure 3:
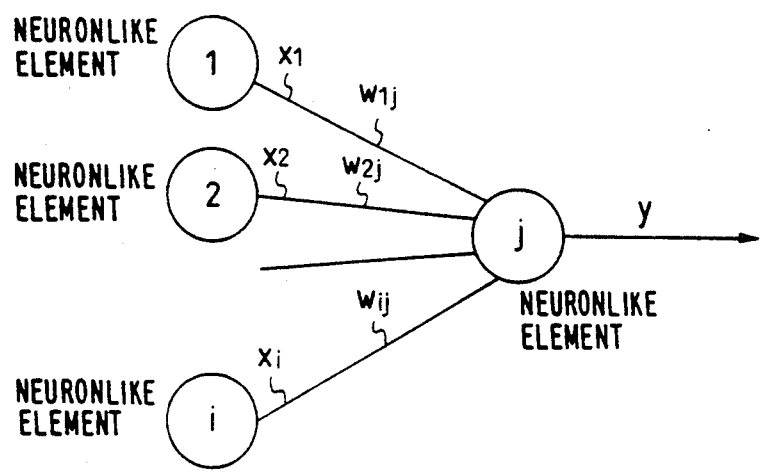
FIG. 3 is a schematic block diagram for showing an example of a neuronlike element.
Figure 4:
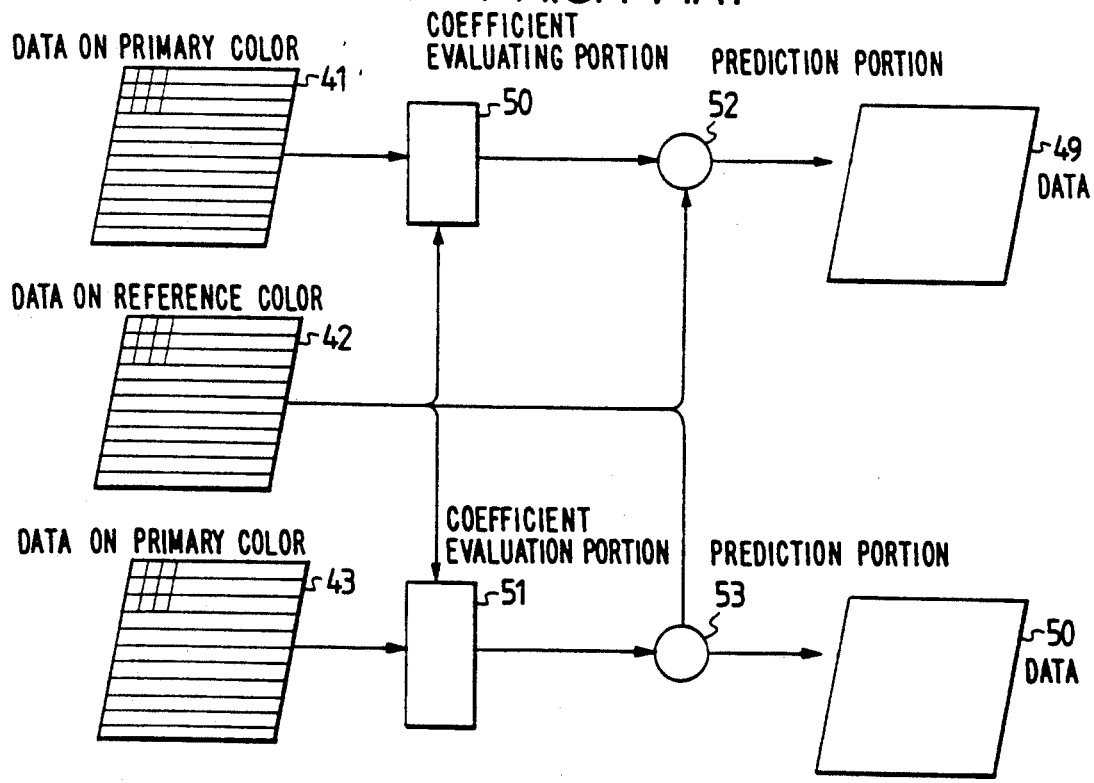
FIG. 4 is a schematic block diagram for illustrating a conventional coloring device.

FIG. 1 is a schematic block diagram for illustrating the fundamental configuration of the preferred embodiment of the present invention. In this figure, reference numeral 5 denotes a monochromatic image. First, signals 1 representing the monochromatic image 5 are inputted into a sampling means 10 which selects a block composed of n×m pixels (n and m are positive integers) from the monochromatic image 5 and then outputs signals 2 representing the pixels of the selected block. Subsequently to this, the signals 2 are inputted into an artificial neural network means (hereunder sometimes referred to simply as a neural network means) 11 which outputs signals 3 representing trichromatic components 6, 7 and 8 of color pattern information of n×m pixels of a color image to be generated by this coloring device. Further, the signals 3 are stored by a generating means 12 in locations thereof corresponding to the positions of the pixels of the block in the monochromatic image 5 as color signals 4 corresponding to the trichromatic components 6, 7 and 8 of the color pattern information of the pixels of the color image to be generated. The neural network means 11 can freely color objects contained in a block of the image 5 according to patterns contained in the block composed of the n×m pixels by repeatedly and adaptively learning color information corresponding to various kinds of patterns to be contained in a block composed of n×m pixels in advance and by further judging the similarity between the object contained in the block and each learned pattern and additionally judging the similarity that between the object and a part of each learned pattern to some extent. Thus, the neural network means 11 may be adapted to output data indicating that even in case where a pattern actually contained in the block is similar to one of the learned patterns or to a part of one of the learned patterns to some extent, the predetermined color is given to the pattern actually contained in the block. As a learning algorithm, one of various methods is employed. For example, a backpropagation algorithm is employed. Incidentally, the description of the backpropagation algorithm itself is omitted herein for simplicity of description. With respect to the detail of the backpropagation, please refer to, for instance, a work entitled "PARALLEL DISTRIBUTED PROCESSING, Explorations in the Microstructure of Cognition", Vols. 1 and 2 written by Runmelhart, D. E., McClelland, J. L., and the PDP Research Group and published by MIT Press, Cambridge, Mass. in 1986. Further, for the purpose of determining an optimal color given to a pattern in the block, an optimal solution is obtained by using a method of steepest descent. FIG. 2 is a detailed view of the neural network means 11 of FIG. 1. In this figure, reference numerals 22, 23 and 24 designate trichromatic components of color pattern information, which are inputted to an artificial neural network simulation device (hereunder referred to simply as neural network device) 30. Further, reference numeral 21 denotes monochromatic pattern information. This monochromatic pattern information represented by n×m block signals 26 respectively corresponding to n×m pixels (or occasionally represented by the signals 1) are also inputted to the neural network device 30. Moreover, color components 25 used for predicting and estimating colors are inputted to this device 30, which is trained by using the learning algorithm such as the backpropagation algorithm as above described. An inner portion of the neural network device 30 is composed of the combination of neuronlike elements 31. Thus, a neural network model is realized by employing hardware and software as above described. FIG. 3 is a schematic block diagram for showing an example of the neuronlike elements. As is shown in this figure, a neuronlike element j calculates first a sum of products obtained by multiplying inputs $X_1, X_2, \ldots, X_i$, which are respectively sent from other neuronlike elements $1, 2, \ldots, i$, by corresponding internal state parameters $W_{1j}, W_{2j}, \ldots, W_{ij}$ and then outputs a value y of a nonlinear function F(z) when a variable z takes a value equal to the sum of the products, as given by the following equation.

$$y = F(W_{1j} \times X_1 + W_{2j} \times X_2 + \ldots + W_{ij} \times X_i)$$

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A coloring device for transforming a monochromatic image to a color image having three primary color component images by coloring the monochromatic image and for storing the three primary color component images, comprising:

an image sampling means for sampling an input signal block representing a group of n×m pixels of a monochromatic image and for outputting first signals representing the sampled pixels of the input signal block of the monochromatic image;

an artificial neural network, means for inputting to said artificial neural network, substantially simultaneously, pattern information on patterns to be contained in the monochromatic image and color information on first data indicating colors given to the patterns indicated by the pattern information prior to generation of a color image signal, said artificial neural network having internal state parameters which are adaptively optimized by using a learning algorithm prior to the generation of a color image, said artificial neural network operating for receiving data representing the first signals, for determining which of colors preliminarily and respectively assigned to patterns to be contained in the group of pixels of the monochromatic image represented by the input signal block is given to a pattern actually contained in the group of pixels represented by the input signal block and for outputting second signals representing second data on three primary colors which are used to represent the determined colors given to the patterns actually contained in the group of pixels represented by the input signal block; and color image storing means for receiving the second signals outputted from said artificial neural network, for storing the received second signals in locations thereof corresponding to the positions of the pixels represented by the input signal block and for outputting third signals representing the three primary color component images of the pixels represented by the input signal block; wherein said image sampling means further functions for scanning the whole of the monochromatic image by generating successive input signal blocks representing successive groups of n×m pixels to be sampled, thereby outputting third signals for all pixels of the monochromatic image.

2. A coloring device for transforming a monochromatic image to a color image having three primary color component images by coloring the monochromatic image and for storing the three primary color component images, comprising:

an image sampling means for sampling an input signal block representing a group of n×m pixels of a monochromatic image and for outputting first signals representing the sampled pixels of the input signal block of the monochromatic image;

an artificial neural network for receiving the first signals outputted from said image sampling means, for determining the three primary color components of each pixel correspondingly to a pattern actually contained in the input signal block according to information on corresponding relation between three primary color components and patterns to be contained in each input signal block, which relation is preliminarily determined by internal state parameters adaptively optimized by using a learning algorithm, and for outputting second signals representing three primary color components of each pixel represented in the input signal block; and color image storing means for receiving the second signals outputted from said artificial neural network, for storing the received second signals in locations thereof corresponding to the positions of the pixels represented in the input signal block and for outputting third signals representing the three primary color component images; wherein said image sampling means further functions for scanning the whole of the monochromatic image by generating input signal blocks representing all the pixels of the monochromatic image.

3. A coloring device as set forth in claim 2, wherein the pattern contained in the monochromatic image is a graphic form.

4. A coloring device as set forth in claim 2, wherein the coloring of the monochromatic image is performed even when the pattern contained in the monochromatic image is only a part of the preliminarily learned pattern.

5. A coloring device as set forth in claim 2, wherein the coloring of the monochromatic image is performed even when the pattern contained in the monochromatic image is similar to the preliminarily learned pattern.

6. A coloring device as set forth in claim 2, wherein the learning algorithm used in said artificial neural network is a backpropagation algorithm.

7. A coloring device as set forth in claim 2, wherein said artificial neural network uses a method of steepest descent in order to obtain an optimal solution for the purpose of determining an optimal color given to a pattern in the block.

8. A coloring device as set forth in claim 2, wherein said artificial neural network is composed of neuronlike elements having an output r given by $$y = F(W_{1j} \times X_1 + W_{2j} \times X_2 + \ldots + W_{ij} \times X_i)$$

where $X_1, X_2, \ldots X_i$ denote inputs respectively sent from other neuronlike elements $1, 2, \ldots, i$, and $W_{1j}, W_{2j}, W_{ij}$ represent internal state parameters, and $F(z)$ denotes a nonlinear function, and z designates a variable.

9. Apparatus for transforming first signals representing a monochromatic image to second signals representing a color image having three primary color component images comprising:

first means (5) for obtaining a two dimensional image of an object and producing first signals containing monochromatic image data (1) representing the image;

adaptive means (11) for performing an adaptive algorithm for generating color signals based on inputted monochromatic image data and on pattern data defining a pattern contained in an image represented by the monochromatic image data inputted thereto, said adaptive means comprising an artificial neural network for receiving the inputted monochromatic image data and for determining the three primary color components of each pixel in the inputted monochromatic image data correspondingly to a pattern actually contained therein according to information on a corresponding relation between three primary color components and patterns to be contained in said inputted monochromatic image data, which relation is preliminarily determined by internal state parameters adaptively optimized by using a learning algorithm, and for outputting said second signals (3) as said color signals generated by said adaptive means, said second signals including color image data representing three primary color components of each pixel of the inputted monochromatic image data; and applying means for applying the results of the adaptive algorithm performed by said adaptive means to the monochromatic image data to transform said first signals representing monochromatic image data to said second signals representing said color image data.

10. Apparatus for transforming first signals representing a monochromatic image to second signals representing a color image as recited in claim 9, wherein said applying means comprises:

image sampling means (10) for sampling a portion of the two dimensional image by selecting an input block of n×m pixels of said monochromatic image data and for outputting third signals (2) to said artificial neural network, said third signals representing the sampled pixels of the input block of the monochromatic image data, thereby enabling said artificial neural network to output a plurality of sets of second signals each set representing three primary color components of each pixel of the input block of said monochromatic image data, and generating means receiving each set of the second signals representing an input block for combining said plurality of sets of second signals and outputting said color image data, wherein said image sampling means further functions for scanning the whole of the monochromatic image by selectively moving the input block, which is composed of the n×m pixels to be sampled, over all of the monochromatic image, whereby said artificial neural network of said adaptive means performs said adaptive algorithm on a sequence of blocks of the monochromatic image data and outputs a sequence of blocks of color data for outputting as a single color image data.

* * * * *